United States Patent
Stehle

(10) Patent No.: US 6,695,746 B2
(45) Date of Patent: Feb. 24, 2004

(54) METHOD OF AIDING THE SHIFTING OPERATION IN MOTOR VEHICLES WITH AN AUTOMATED MANUAL OR AUTOMATIC TRANSMISSION

(75) Inventor: Heinz Stehle, Weissach (DE)

(73) Assignee: Dr. Ing. h.c.F. Porsche AG, Stuttgart (DE)

( * ) Notice: Subject to any disclaimer, the term of this patent is extended or adjusted under 35 U.S.C. 154(b) by 0 days.

(21) Appl. No.: 10/131,043

(22) Filed: Apr. 25, 2002

(65) Prior Publication Data

US 2002/0160878 A1 Oct. 31, 2002

(30) Foreign Application Priority Data

Apr. 26, 2001 (DE) .......................... 101 20 445

(51) Int. Cl.⁷ .......................... B60K 41/04; F16H 59/60
(52) U.S. Cl. .......................... 477/109; 477/97
(58) Field of Search .......................... 477/107, 109, 477/111, 97; 74/335

(56) References Cited

U.S. PATENT DOCUMENTS

| | | | | |
|---|---|---|---|---|
| 5,682,790 A | * | 11/1997 | Genise | 477/111 X |
| 5,894,758 A | * | 4/1999 | Walker | 477/109 X |
| 6,224,511 B1 | * | 5/2001 | Steeby | 477/111 |
| 6,358,183 B1 | * | 3/2002 | Hughes et al. | 477/111 |
| 6,361,473 B1 | * | 3/2002 | Mason et al. | 74/335 X |
| 2001/0022245 A1 | * | 9/2001 | Rogg | 180/65.2 |

OTHER PUBLICATIONS

"EKS von Fichtel & Sachs," mot–Technik, 11/91, pp. 136–138.

* cited by examiner

Primary Examiner—Roger Pang
(74) Attorney, Agent, or Firm—Crowell & Moring LLP

(57) ABSTRACT

Method of aiding shifting operations in motor vehicles with automated manual or automatic transmissions. The current operating conditions are detected and analyzed in an analyzing unit. In the event of an operation of the motor vehicle which indicates an imminent shifting operation, a precontact switch, which is arranged in an operating device for the gear selection, switches into an active mode. This precontact switch emits a signal when the driver approaches to grip the operating device for the gear shifting. In the event of the occurrence of the precontact switch signal, the shifting operation is initiated by a reduction of the engine torque while the driver has not yet gripped the operating device. This clearly shortens the shifting time.

3 Claims, 2 Drawing Sheets

METHOD OF AIDING THE SHIFTING OPERATION IN MOTOR VEHICLES WITH AN AUTOMATED MANUAL OR AUTOMATIC TRANSMISSION

BACKGROUND AND SUMMARY OF THE INVENTION

This application claims the priority of German Application No. 101 20 445.0, filed Apr. 26, 2001, the disclosure of which is expressly incorporated by reference herein.

An electronic clutch system (EKS) is known from the journal *mot-Technik* (November 1991, Page 136 to 138). This electronic clutch system acquires the operational data sensed by sensors, such as the rotational engine speed, the transmission input rotational speed, the vehicle velocity, the current gear, the accelerator pedal movement and the gear shift lever movement and analyzes these operational data as to whether the current operation indicates a possible shifting operation. If a possible shifting operation is indicated, the engine is uncoupled and the muscle effort normally applied by the driver is taken over by the electronic system in the control unit and the actuators arranged on the output side.

The method according to the invention has the advantage that, in motor vehicles with an automated manual or automatic transmission, the gear shifting can be implemented much more rapidly, whereby the driving comfort is significantly increased. The providing of a precontact switch in the operating device for the shifting device, which already initiates a declutching operation while the driver grips the operating device and therefore carries out the shifting operation earlier, leads to a faster shifting operation.

It is a particularly advantage that the precontact switch is a type of proximity switch which operates on the basis of infrared radiation, ultrasound, induction, light waves and/or electromagnetic waves. It is another advantage, the present system has a self-learning design, so that it learns on the basis of operating conditions, such as the rotational speed and the load, when a shifting operation will soon be initiated.

Another advantage is the fact that the precontact switch is switched active only when the operating conditions of the motor vehicle are in a range which points to an imminent shifting operation.

Other objects, advantages and novel features of the present invention will become apparent from the following detailed description of the invention when considered in conjunction with the accompanying drawings.

BRIEF DESCRIPTION OF THE DRAWINGS

An embodiment of the invention is illustrated in the figures and will be explained in detail in the following description.

DETAILED DESCRIPTION OF THE PREFERRED EMBODIMENT

Figure 1:
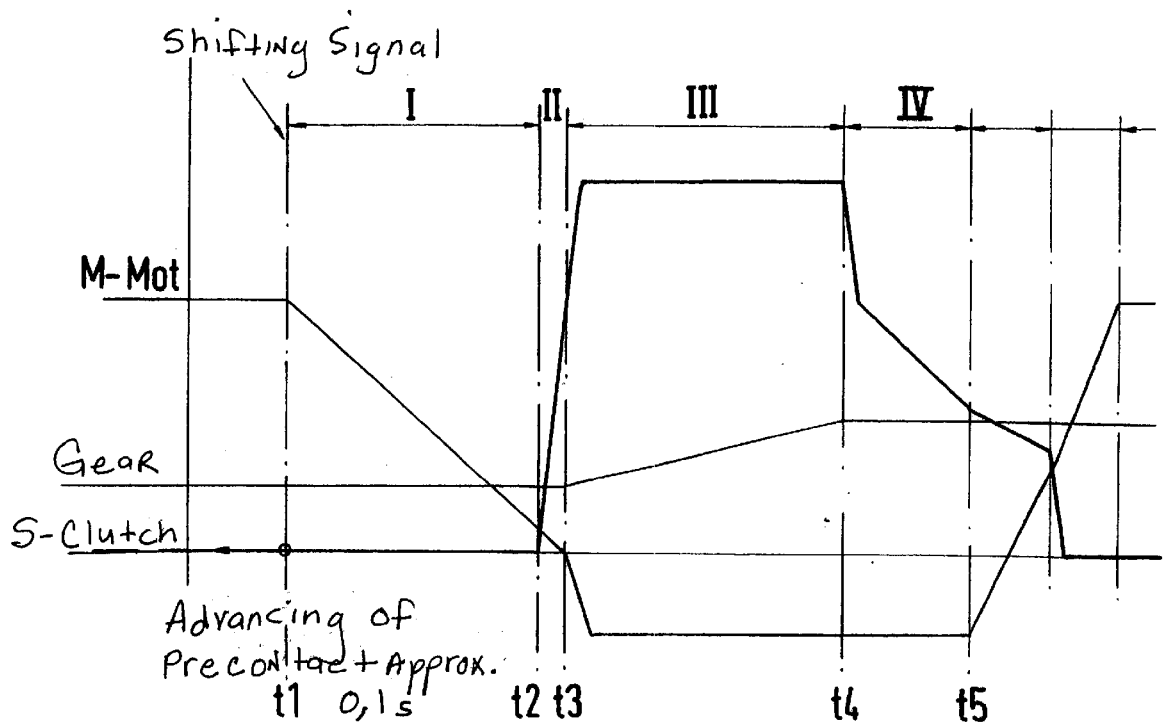
FIG. 1 is a schematic view of the chronological sequence of several parameters during a shifting operation.

FIG. 1 illustrates the individual activities during a shifting operation in a time diagram, in which case the individual sequences are listed here without the integration of the precontact switch. As illustrated, the internal-combustion engine operates under detectable operating conditions. FIG. 1 illustrates, for example, the engine torque M-Mot, the engaged gear and the clutch. At the point in time t1, a control unit, which is not shown, receives the shifting signal. Then, the engine torque is lowered in a phase I. Phase II, in which the clutch opens and separates the engine from the transmission, starts at the point in time t2. At the end of this phase II, after the opening of the clutch, the gear shifting takes place in phase III. In the subsequent phase IV, the clutch engages again, and after the engagement, at the point in time t5, in phase IV, the engine torque M-Mot is raised again for a normal driving operation. Usually, this shifting operation takes approximately 0.6 seconds from the moment at which the shifting signal has taken place. By providing a precontact switch in the operating device for the shifting, this shifting operation can be shortened significantly. In principle, this then means that the lowering of the engine torque does not start as late as with the actual shifting signal but already slightly earlier, and the entire shifting operation is therefore shortened.

Figure 2:
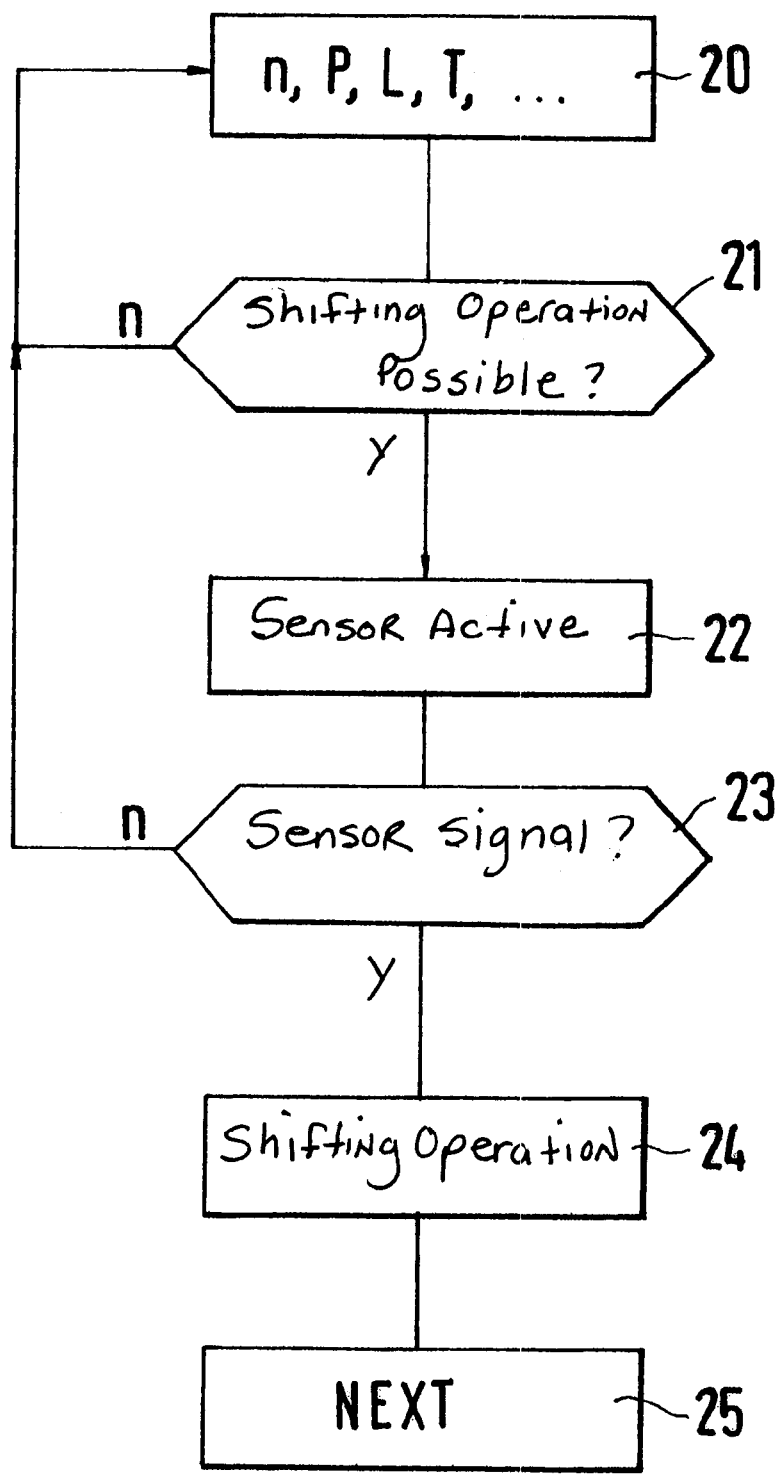
FIG. 2 is a view of the individual process steps for the implementation of the method of the invention while utilizing the impulse of the precontact switch.

FIG. 2 shows the individual process steps for implementing the method according to the invention while utilizing the impulse of the precontact switch during a shifting operation. As a starting point, in a processing step 20, a detection of the current operating conditions is carried out continuously and the latter is then analyzed in a query 21 on the output side as to whether, on the basis of the current operating conditions, a shifting operation would be plausible. If this is not so, the no-output of this query 21 branches back to processing step 20 and the current operating conditions of the internal-combustion engine are detected again. If a shifting operation is possible, the yes-output leads to a processing step 22 in which the precontact switch, which is, for example, a sensor in the operating device, is switched active. Various methods of operation are possible as the precontact switch or the proximity sensor. After the active-switching of the precontact switch, in a query 23, this sensor signal is examined as to whether the driver's hand has moved in the direction of the operating device. If this is not so, the no-output of this query 23 also leads back to the start of the operation, and the current operating conditions are detected and analyzed again.

If a sensor signal was emitted, in processing step 24, the shifting operation is now triggered, as explained with respect to FIG. 1. After the shifting operation has been concluded, this is detected processing step 25 and the vehicle is in the normal driving operation, in which case a monitoring of the current operating position takes place again.

Various operating principles can be used as sensors for the precontact switch. Thus, the use of an electromagnetic sensor, of an infrared sensor, of an optical and/or of an ultrasonic sensor is possible. In each case, an approaching of the operating device and thus in principle of the gear 1 shift lever by the driver's hand is detected and the shifting operation is prepared correspondingly.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method of increasing the shifting speed of a motor vehicle, comprising the steps of:

determining current operating conditions of said motor vehicle;

analyzing said determined operating conditions and outputting an enabling signal when a shifting operation of said transmission is feasible;

arranging a precontact switch in an operating device for the gear selection of said transmission wherein said precontact switch senses an imminent shifting operation by a driver of said motor vehicle and wherein said precontact switch outputs a precontact switch signal when both said driver imminent shifting operation is sensed and said enabling signal is output; and initiating a shifting operation in response to said precontact switch signal by reducing engine torque of said motor vehicle, wherein said imminent shifting operation by said driver is a movement of said driver in the direction of the operating device.

2. The method according to claim 1, wherein said precontact swtich is a proximity sensor.

3. The method according to claim 2, wherein said proximity sensor is at least one of an electromagnetic sensor, an infrared sensor, an ultrasonic sensor and an optical sensor.

* * * * *